Sept. 21, 1965  E. A. MUIJDERMAN  3,207,563
AXIAL BEARING PROVIDED WITH A LUBRICANT
Filed May 23, 1963

INVENTOR.
EVERHARDUS A. MUIJDERMAN
BY
AGENT 3,207,563
**AXIAL BEARING PROVIDED WITH
A LUBRICANT**
Everhardus Albertus Muijderman, Emmasingel, Eindhoven, Netherlands, assignor to North American Philips Company, Inc., New York, N.Y., a corporation of Delaware
Filed May 23, 1963, Ser. No. 282,770
Claims priority, application Netherlands, June 8, 1962, 279,552
3 Claims. (Cl. 308—172)

The invention relates to an axial bearing provided with a lubricant for a rotatable shaft, said bearing being provided with a stationary supporting member and a thrust member co-operating with the supporting member one of said members being provided over at least part of its surface with uniformly distributed, uninterrupted, similar, shallow grooves, the center line of which forms part of a helix having a course such that, in operation, lubricant is pushed from the outer side of the bearing to the inner side.

It has been proposed to use such bearings with oil as a lubricant. The thrust is built up in the bearing by the push of the lubricant from the outside to the inside owing to the grooves. These bearings are particularly suitable for use with vertical shafts performing a great number of revolutions. It has been found that the supporting power of said bearings is much greater than that of other known bearings. Moreover, the friction coefficient is much lower, so that comparatively low frictional losses are involved. The use of oil has, however, the disadvantage that it is not suitable for use in apparatus which must be operable in any position. With the use thereof for example in household apparatus, the oil is likely to soil the apparatus in operation or during transport, which results in the known inconveniences.

It was a surprise to find that a bearing of the kind set forth can nevertheless be rendered suitable for use in such apparatus. In accordance with the invention use is made to this end of a lubricant having such a consistency that in normal circumstances, when the shaft stands still, it forms a solid substance, which is accumulated mainly near the entrance of the grooves while the lubricant urged inwardly upon rotation of the shaft produces a complete lubricating film between the members of the bearing.

The lubricant may be formed by fat; for example thixotrope fats provide very satisfactory results. When use is made of a non-evaporating vacuum fat, the bearing may also be employed in an evacuated space, while the complete lubricating film is maintained.

An important advantage of the bearing according to the invention consists in that the bearing itself pushes the fat into the bearing gap, when it reaches a given number of revolutions. After a few revolutions a complete lubricating film is formed. In order to obtain a complete lubricating film the fat must be introduced under pressure, under the operational conditions, into the gap of the bearing. Hitherto no suitable structure has been found to obtain a lubricating film in a simple manner with the aid of fat. With the bearing according to the invention this problem is solved in a desirable manner.

The fat may be disposed of at the beginning of the grooves. Upon rotation of the shaft it is pushed into the bearing, where it produces a complete lubricating film. When the shaft stands still, the fat is accumulated mainly near the entrance of the grooves. It appears that always an adequate quantity of fat remains in the immediate proximity of the bearing, so that even after a long period of inactivity a complete lubricating film can be obtained. Even in the case of very small dimensions, for example with a thrust member having a maximum diameter of 4 mms., the bearing according to the invention is found to yield excellent results. With the known bearings no complete lubricating film is found to appear in the case of such small dimensions.

An advantageous embodiment of the invention is obtained by providing an apparatus comprising a rotatable shaft spported by one or more axial bearings and required to operate in any position with one or more bearings according to the invention. Then loss of lubricant is avoided irrespective of the position in which the bearing is employed. The lubricant is always urged inwardly and a complete lubrication is ensured, while the lubricant can serve for a long time.

The invention will be described with reference to the drawing, which shows an embodiment.

Figure 1:
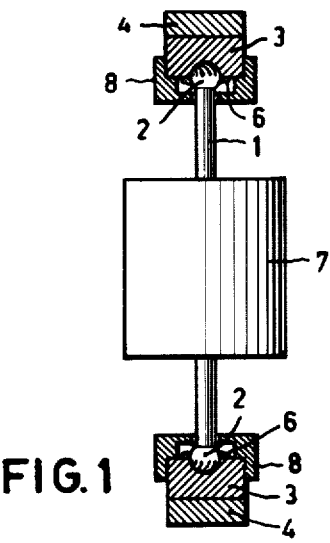
FIG. 1 shows a shaft for use in a household apparatus, the shaft being provided at both ends with a bearing according to the invention.
Figure 2:
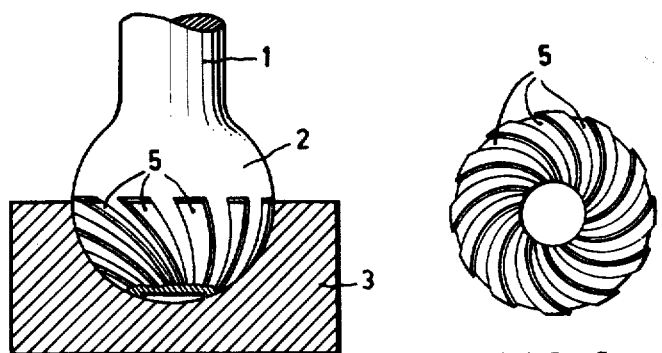
FIG. 2 shows a spherical bearing, partly in an elevation and partly in a sectional view.
Figure 3:
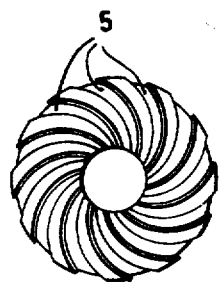
FIG. 3 is a plan view of the groove pattern.

A shaft 1, on which for example a rotor 7 is secured, is provided at both ends with a spherical thrust member 2 in the embodiment shown in FIGS. 1, 2 and 3. The ball exerts a pressure in the axial direction of the shaft on the supporting member 3. The supporting members are held in a holder 4, which is shown only partly. The thrust member 2 is provided over part of its surface with grooves 5 of small depth, the center line of which has the form of a helix (see FIGS. 2 and 3). A bearing thus constructed is capable of absorbing radial forces in addition to axial forces.

The fat 6 is provided near the entrance of the grooves in the bearing. A screening hood 8 prevents dust and the like from entering the bearing. When the shaft rotates, the fat is pushed into the bearing by the groove pattern, so that a pressure is produced and a complete lubricating film is obtained. From experiments it has been found that during the rotation of the shaft no metallic contact is produced between the supporting member and the thrust member. With a bearing having a ball diameter of 4 mms. a number of 100 revolutions a minute largely suffices and after a few revolutions a complete lubricating film is obtained. This also applies to radial load.

When the shaft stands still, the lubricant is partly pushed out of the bearing and is accumulated around the entrance of the grooves. Thus, there always remains an adequate quantity of fat in the immediate proximity of the ball, so that even after a long period of inactivity a complete lubricating film is obtained.

Figure 4:
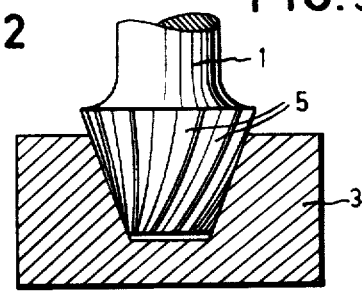
FIG. 4 shows a bearing, the surface of which is conical.

The thrust member need not be shaped in the form of a ball. It may have the form of a cone, the supporting member then having a conical cavity as is illustrated in FIG. 4. As a further alternative, the supporting member and the grooved thrust member may be flat. In this latter structure, however, radial forces cannot be absorbed by the bearing.

The grooves may be provided on the supporting member instead of being made on the thrust member. This is not essential for the hydro-dynamic action of the bearing.

Many kinds of fat may be used yielding satisfactory results; particularly thixotrope fats appear to operate satisfactorily.

If non-evaporating vacuum fats are used, the bearing may also be employed in an evacuated space.

What is claimed is:

1. An axial thrust bearing provided with a lubricant, said bearing being provided with a stationary, cup-shaped, closed-bottom, supporting member and a rotatable thrust member co-acting with said supporting member, one of said members being provided over at least part of its surface with uniformly distributed, uninterrupted, similarly-shaped shallow grooves, each of said grooves being of a smaller width at the bottom of the grooves than at the top of said grooves the center line of which forms part of a helix, said lubricant, in operation, being pushed from the outer side of said bearing to said inner side thereof by said grooves, said lubricant having a consistency such that under normal conditions when said thrust member is inoperative forms a solid substance which is accumulated mainly adjacent to the entrance of said grooves, while the lubricant urged inwardly upon the rotation of said thrust member creates a lubricating film between the members of said bearing.

2. An axial thrust bearing for a rotatable shaft provided with a lubricant as claimed in claim 1 wherein said thrust member is ball-shaped.

3. An axial thrust bearing for a rotatable shaft provided with a lubricant as claimed in claim 1 wherein said thrust member is conical-shaped.

References Cited by the Examiner

UNITED STATES PATENTS 2,966,381   12/60   Menzel _____ 308—122

FOREIGN PATENTS 779,419   7/57   Great Britain.

OTHER REFERENCES

Manufacture and Application of Lubricating Greases (1954 Edition), by C. J. Boner; Published by Reinhold Publishing Corp; Copy in Scientific Library; Pages 65 thru 69 relied upon.

ROBERT C. RIORDON, *Primary Examiner.*

FRANK SUSKO, *Examiner.*